F. E. KUSTER.
TRAY MAKING MACHINE.
APPLICATION FILED MAY 4, 1920.

1,403,173.

Patented Jan. 10, 1922.
8 SHEETS—SHEET 7.

Inventor
Frederick E. Kuster,

By E. M. Bond
Attorney

Witness

UNITED STATES PATENT OFFICE.

FREDERICK E. KUSTER, OF EVANSVILLE, INDIANA.

TRAY-MAKING MACHINE.

1,403,173.   Specification of Letters Patent.   Patented Jan. 10, 1922.

Application filed May 4, 1920. Serial No. 378,793.

*To all whom it may concern:*

Be it known that I, FREDERICK E. KUSTER, a citizen of the United States, residing at Evansville, in the county of Vanderburg and State of Indiana, have invented certain new and useful Improvements in Tray-Making Machines, of which the following is a specification.

This invention relates to certain new and useful improvements in machines for making trays or what are known to the trade as butter, lard or pickle dishes and the like, and to mechanism for tinning the top edges of the sides thereof.

The present invention has for its object among others to provide an improved simplified machine, accurate and reliable in its functions, positive in its action and adapted to be run without the employment of skilled labor and also capable of turning out a greater number of trays in a given time.

The present invention has for a further object to provide novel means for creasing or scoring the blank and giving a deeper cut at predetermined places so as to enable the blank to more readily fold, and to avoid undue bulk or thickness at the points of fold.

I aim further at improvements in the details of construction of the mechanism for accomplishing the above ends.

Other objects and advantages of the invention will hereinafter appear and the novel features thereof will be particularly pointed out in the appended claims.

The invention, in its preferred form, is clearly illustrated in the accompanying drawings, which, with the numerals of reference marked thereon, form a part of this specification, and in which—

Like numerals of reference indicate like parts throughout the different views.

Referring to the drawings, 1 designates a suitable base or frame adapted to provide suitable support and bearings for the different shafts and movable parts of the machine and adapted to support certain of the operative parts in suitably elevated positions.

2 is the main driving shaft mounted in suitable bearings in the said frame or base, and deriving its power from any suitable source, 3 being the drive pulley on said shaft, and 4 a hand wheel by which the shaft may be turned by hand when occasion may require.

On the main drive shaft 1 is a small gear 5 which meshes with a large gear 6 on a shaft 7 mounted in suitable bearings and upon which is carried the small gear 8, which meshes with the large gear 9, upon the transverse stud or stub shaft 10 mounted in the inclined member 11 of the frame 1, and upon this stub shaft 10 is a gear 12, the said gears 9 and 12 being fastened to move together and both being loose on the stub shaft 10.

13 is a gear carried loosely on the stud or stub shaft 14 which is supported on the member 11 of the frame and which gear 13 in turn meshes with the gear 15 on the shaft 16 mounted in suitable bearings on the frame 1 and upon this last-named shaft (16) is a sprocket wheel 17, for a purpose hereinafter set forth.

Figure 3:
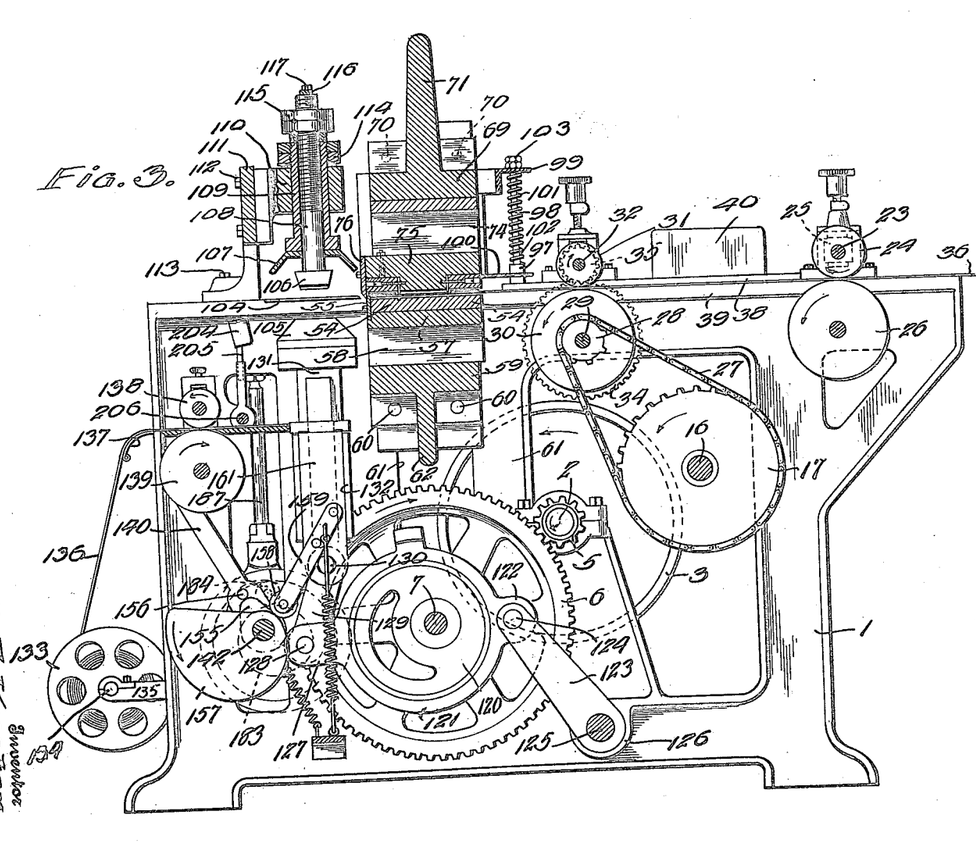
Figure 3 is a vertical longitudinal section approximately on the line 3—3 of Figure 2.

18 is a gear meshing with the gear 15 on the shaft 16, this gear 18 being carried by the stud or stub shaft 19 supported in the member 11 of the frame, and the said gear 18, in turn, meshes with a gear 20 on a shaft 21 mounted in suitable bearings in the frame 1 and this last-named gear, in turn, meshes with the gear 22 on the shaft 23, mounted in suitable bearings on the frame 1 and carrying the feed roller 24, see Figure 3. The shaft 23 carrying the feed roller 24 is mounted in a vertically adjustable box 25, of known construction, for a well-known purpose. 26 is the lower feed roller cooperating with the feed roller 24, as seen in Figure 3.

27 is a sprocket chain passing around the sprocket wheel 17 and around the sprocket wheel 28 carried by the shaft 29 mounted in suitable bearings in the frame 1 and carrying the lower feed roller 30, as seen best in Figure 3, which feed roller cooperates with the upper feed roller 31 on the shaft 32 mounted in a vertically adjustable boxing 33, as seen in Figure 3, for the well-known purpose, there being nothing novel claimed in the boxing, and hence a further detailed description thereof is deemed unnecessary.

Figure 1:
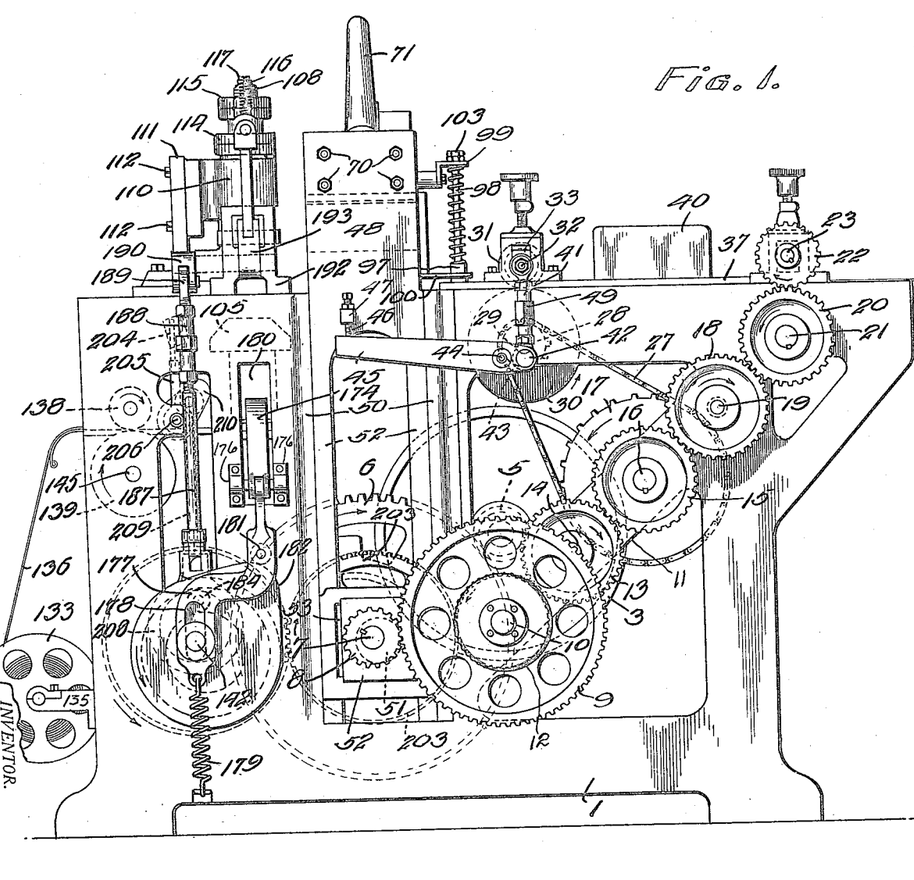
Figure 1 is a side elevation of a tray-forming and tinning machine constructed in accordance with my present invention.

34 is a gear on the shaft 29, meshing with a gear 35 on the shaft 32, as seen by dotted lines in Figure 3, it being understood that the gearing between the shafts of the upper and lower feed rollers 30 and 31 is located upon the side of the machine opposite the gearing between the upper and lower feed rollers 24 and 26, as will be readily understood upon reference to Figures 1 and 3.

By this means the paper or material from which the tray or dish is formed is fed, such paper 36 being fed from a roll in the usual manner, said roll being supported in close proximity to or at a distance from the machine as may be most expedient. The paper in its passage through the feed rolls is guided between guides 37 and 38 upon opposite sides of the table or top portion 39 of the frame. 40 is a vertically disposed strip or member serving as a further guide to the edge of the paper to take care of the buckling of the paper between the feed rolls.

The primary feed rolls 24 and 26 are revolved continuously. The second set of feed rolls 30 and 31 are revolved continuously but feed intermittently, for a purpose which will hereinafter appear. For this purpose the upper feed roll 31 is raised at intervals, and this is accomplished through the medium of the pendant member or hanger 41 mounted at its upper end on the shaft 32 and at its lower end connected, as at 42, with the short arm 43 of a lever fulcrumed at 44, the long arm 45 of which extends rearward of the machine, as seen best in Figure 1, where it is designed to be engaged by a screw or the like 46 adjustably mounted in a lug or the like 47 projecting from the vertically reciprocatory member 48 which carries the knife for creasing and scoring the paper. The member 41 is rendered adjustable in length by suitable means, such as a turn buckle, as seen in Figure 1. Downward movement of the member 48, bringing the screw 46 into engagement with the free end of the long arm 45 of the lever causes the elevation of the feed roller 31 for a purpose which will be explained as the description proceeds.

The member 48 is guided in its vertical movements between guides 50 which may be of the ordinary dove-tail form or of any approved form which will serve to maintain rectilinear relation between the parts and cause the member 48 to at all times move in a predetermined path.

The shaft 7 is mounted in suitable bearings in the frame 1, and as a means for reciprocating the member 48, and the knives movable therewith, this shaft is provided at each end with eccentrically arranged pins or portions 51. This shaft is reduced in diameter at the end, as seen in Figure 1, to carry the gear, but the pins or eccentric portions 51 are of less diameter than the shaft proper, although integral therewith, and are adapted to rotate in blocks 52, one at each side of the machine, which blocks are, in turn, adapted to reciprocate horizontally in the lower ends of the vertically reciprocatory side members 52 of the member 48, as will be readily understood upon reference to Figure 1. As will be seen in said Figure 1, the space 53 is provided to allow of the horizontal reciprocation of said blocks or boxes, thus, through the medium of the eccentric portions of the shaft 7 and the blocks, the rotation of the shaft 7 is converted into an even and smooth up and down motion or vertical reciprocation of the side members of the member 48 which carry the knives for scoring or creasing and cutting the blanks from which the tray is formed.

The upper and lower dies carrying the knives for scoring and cutting the paper are carried by the side members of the member 48, being disposed therebetween and bolted thereto and to the frame, as will now be explained. 54 is the lower die shown in top plan in Figure 12 and in vertical section in Figure 13. It is provided with the knife 55 secured thereto in any suitable manner, as by bolts 56, see Figures 3, 12 and 13. This lower die rests upon the table 57 having the depending side portions 58 which, in turn, rest upon the member 59 which is bolted by suitable bolts or the like 60 to the adjacent side members 61—61 of the frame 1, as shown clearly in Figure 3. This member 59 is provided with the strengthening rib 62, as shown in Figure 3.

Figure 12:
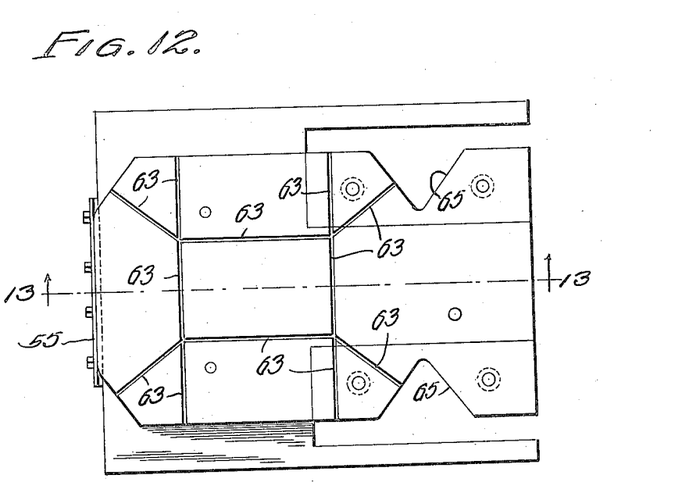
Figure 12 is a top plan view of the bottom die employed in connection with the die shown in Figure 10.
Figure 13:
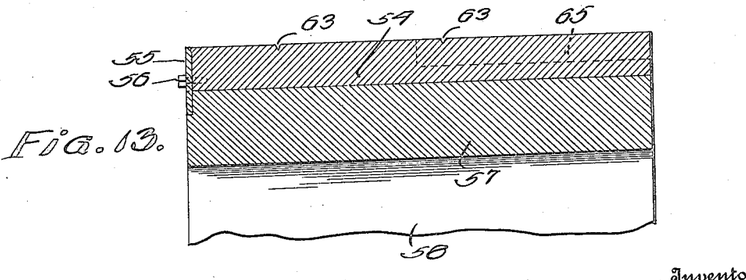
Figure 13 is a section on the line 13—13 of Figure 12, looking in the direction of the arrow.

The top face of the bottom die 54 is provided with grooves or depressions 63, see Figures 12 and 13, which cooperate with the corresponding scoring or creasing knives carried by the upper die, these being of well-known construction and mode of operation to score or crease the blanks from which the tray is formed. These scoring or creasing knives score or crease the paper to form the bottom and the sides and ends of the tray, as will be readily understood from Figure 12, and the corners of the blank are also cut by means of the male and female dies or punch, as seen at 64 and 65, in Figures 10 and 12.

Figures 10, 11:
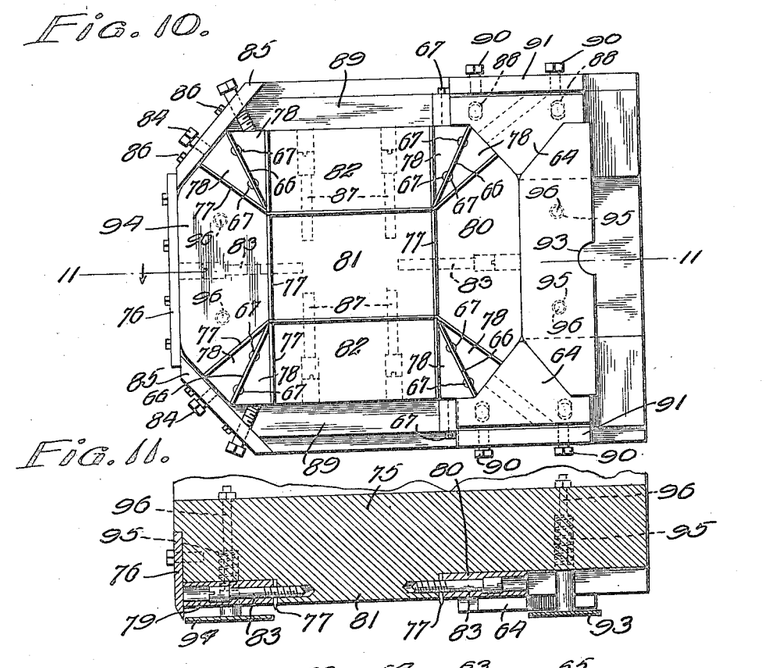
Figure 10 is a bottom plan view of the upper die employed for forming the creases and cuts in the blank.
Figure 11 is a vertical section on the line 11—11 of Figure 10, looking in the direction of the arrow.

In order to cut the paper between the score lines at the corners of the blank, I provide the angularly-disposed knives 66 which are made adjustable vertically by suitable means, as the rods 67, screw-threaded, as seen at 68, and engaging threaded openings in the top member 69 of the vertically-movable knife-carrier 48, this top member being bolted to the upper portions of the side members 52, as seen at 70, the said top member being arched for strength, as shown at 71, this arched portion being shown as provided with a hole 72 to facilitate its being handled. The top portion 69 rests upon a plate 73 having the depending skirt portions 74 terminating in the base portion 75, to which is secured, in any suitable manner, the upper knife 76, for cooperation with the lower knife 55, as will be readily understood by reference to Figure 3. The rods 67 pass through the members 73 and 75 and their lower ends bear upon the cutting knives 66 so that they may be forced downward as occasion may require. These knives, as well as the scoring or creasing knives 77 are held in place by means of the wedges 78 at the corners and the wedges 79 and 80 at the ends, as seen clearly in Figure 10. The center block 81 is stationary and the side blocks 82 are adjustable with relation thereto, as will be readily understood by reference to Figure 10, so that the scoring and cutting knives that act upon the paper blank to score and cut the same are firmly held in predetermined relative position. The members 79 and 80 are clamped in position by means of the screws or bolts 83, as seen in Figures 10 and 11, which are adjustable in the said blocks and pass through the knives or rules that form the creases which determine the shape and size of the bottom of the tray. The wedges 78 are held in place by means of the screws 84 held in the plates 85 bolted to the member 75 by suitable means, as the bolts 86, while the side blocks 82 are held in place by the bolts 87 in a manner similar to that in which the end blocks or members 79 and 80 are secured, all as will be readily understood from Figure 10.

Figure 14:
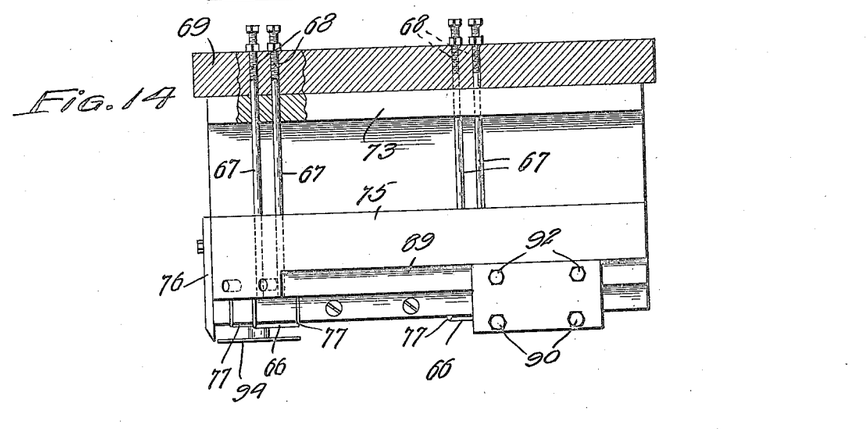
Figure 14 is a detail showing the means for making the deeper crease or cut at the corners of the blank.

The male dies or punches 64 are held in place by means of the vertical bolts 88, as seen in Figure 10, secured in the flanges 89, and are held in adjusted position and firmly in place by means of the set bolts 90 screwed into the plates 91 secured to the flanges 89 by suitable means, as the screws or bolts 92, as seen in Figure 14.

93 and 94 are the strippers which serve to strip the paper off of the knives after they have served their functions in scoring and cutting the said paper to form the blank. Each stripper is mounted for vertical movement, as seen in Figure 11, being held or forced downward by means of a spring 95 around the rod 96 which carries the stripper, as seen in Figure 11, the strippers being shown in their lowermost position in Figure 11, being shown in the position they assume after having pushed the paper off of the knives.

97 is a presser foot adapted to bear upon the paper to stop the forward movement of the paper when the feed roller 31 is moved upward out of contact with the paper by means of the downward movement of the member 48 and the depression of the free end of the arm 45 of the lever hereinbefore described. This presser foot is carried by the rod 98 which is vertically movable and is guided in its movements by the upper and lower guide members 99 and 100 movable with the member 48, a suitable spring 101 around the said rod and bearing at its upper end against the lower face of the upper guide member 99 and at its lower end against a shoulder 102 serving to hold the presser foot downward against the paper until the scoring and cutting has been performed, and then in the upward movement of the member 48, the spring, which has been compressed during the downward movement of the member 48 is released and as soon as the upper guide 99 engages the nuts 103 on the upper end of the rod 98 the presser foot is lifted from its engagement with the paper.

The parts are so timed in their movements that as soon as the presser foot 97 is moved up out of contact with the paper, the upper feed roller 31 is brought back to its lowermost position and again contacts with the paper and the latter is fed forward to the former mechanism by which it is shaped, it being understood that the creased and scored blank is severed from the strip of paper by the knife 76 just before the next scoring is done, or simultaneously therewith, and that the plunger which does the shaping is not brought up into operative position until after the first scored blank has been severed from the strip.

Figure 2:
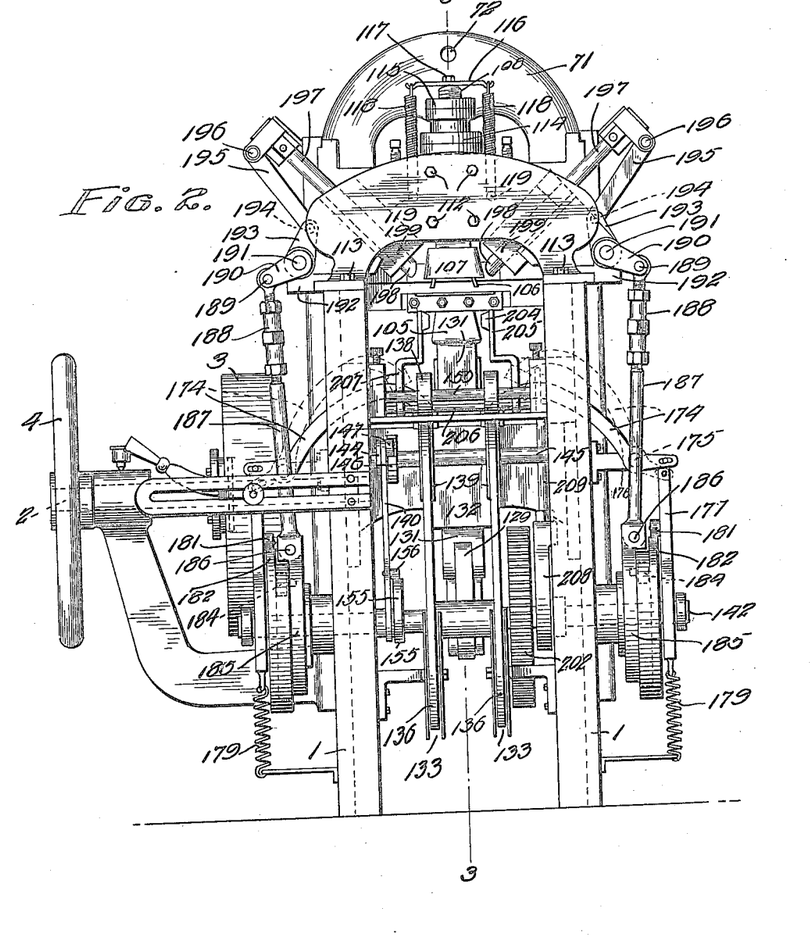
Figure 2 is a front end view of the same.

The shaping or forming mechanism is shown in Figures 1, 2 and 3, to which attention is now directed. In Figure 3 the severed blank is shown at 104. After being severed from the strip by the knife 76, it may be supported by suitable guides in position to be acted upon by the plunger, or it may be allowed to drop upon the plunger which is so timed in its movements as to rise to position to receive the said severed blank as it is cut by the said knife. The die or plunger 105 is mounted for vertical movement, by means soon to be described, while 106 is the primary former which is designed to first fold the sides of the tray or blank over the said form or plunger 105, 107 being the former which acts to afterwards fold the ends of the tray or blank over the said form or plunger 105, the said member 107 being designed to also form the folds at the corners, in a manner well-known and understood in this character of machines. The two members 105 and 107 are movable independently of each other, the one being carried by a stem or rod 108 slidable within the sleeve 109 which, in turn, is slidable within the sleeve or bearing 110 mounted on the yoke 111, as seen at 112, which yoke is secured to the top of the frame of the machine, as shown at 113. The sleeve 109 is provided with nuts 114, while the stem or rod 108 is provided with the adjusting and lock nuts 115, as seen in Figure 3.

116 is a bar secured to the outer end of the stem 108 by means of a bolt 117, the ends of this bar being shown as hooked to engage the ends of springs 118, the other ends of which are secured in any suitable manner, as at 119, to the bearing 110, as indicated by dotted lines in Figure 2.

The plunger 105 is reciprocated in the following manner. On the shaft 7 is an eccentric 120 within the eccentric band 121, the latter being provided with a lug 122, as seen best in Figure 3, to which is pivotally connected one end of the link 123, as at 124, the other end of said link 123 being loosely mounted on a shaft 125 mounted on or in suitable bearings 126 on the frame 1. The eccentric band 121 is provided at a point diametrically opposite the lug 122 with a lug 127 to which is pivotally connected, as at 128, one end of a link 129, the other end of which is pivotally connected, as at 130, with the plunger stem 131, see Figures 2 and 3, movable in a suitable guide 132, see Figure 2.

The mechanism for supplying and applying the tin to the upper edges of the tray after it is formed will now be described.

133 is a reel carried on a shaft 134 mounted in suitable bearings 135 supported from the frame 1 of the machine, as seen clearly in Figures 1, 2, 3 and 4, there being two of these reels, as seen clearly in Figure 2, and these are spaced apart according to the width of the tray so that the tin shall be supplied in proper alinement with the opposite side edges of such tray. The tin 136, of requisite width, is wound upon these reels and is unwound therefrom as required for use during the operation of the machine. These strips of tin pass over a curved spring guide member 137, seen best in Figures 3 and 4, projecting from the rear end of the machine and after passing over these guides pass between the upper and lower feed rollers 138 and 139, see Figures 3 and 4, and by means of these feed rollers these strips of tin are fed into proper position to be applied to the top edges of the tray and to be severed by means soon to be described.

Figure 4:
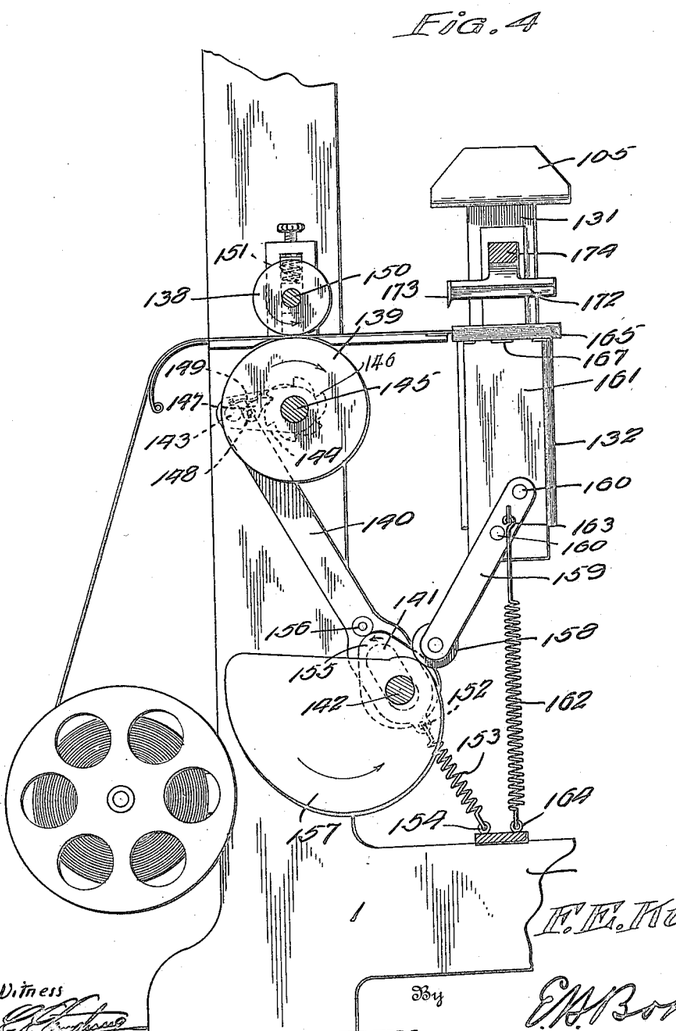
Figure 4 is an enlarged detail, partly in section and partly in elevation, of the strip feed and cutting mechanism.

The lower feed roller is operated through the medium of an arm 140 having at one end an elongated slot 141 in which is received the shaft 142 mounted in suitable bearings in the frame, the other end of the arm 140 being pivotally connected, as at 143, to the end of a link 144 the other end of which is loosely mounted upon the shaft 145, mounted in suitable bearings in the frame, to which shaft is keyed or otherwise fastened a ratchet 146, see Figure 4, with which engages a pawl 147 pivotally mounted, as at 148, on the link 144, 149 being a spring acting on said pawl to hold it to its work. The upper roller 138 is carried by the shaft 150 spring pressed to its work by means of a spring 151, as shown in Figure 4. The lower end of the arm 140 has connected thereto, as at 152, one end of a spring 153, the other end of which is connected, as at 154, with a portion of the frame 1, as seen best in Figure 4. Fast upon the shaft 142 is a cam 155 which is adapted for cooperation with a roller 156 carried by the arm 140, all as shown clearly in Figure 4.

157 is a large cam fast upon the shaft 142 adapted to revolve in the direction of the arrow, seen in Figure 4, and this cam 157 is designed for cooperation with a roller 158 on the arm 159, the other end of which is fastened, as at 160, to the vertical slide 161 which is designed to carry the tin to the tray, it being understood that there are two of these last-described mechanisms, one for co operation with each of the tin-supplying mechanisms hereinbefore described. 162 is a spring fastened at one end, as at 163, to the arm 159, and at its other end fastened, as at 164, to a member of the frame 1, all as clearly illustrated in Figure 4. The slide 161 is guided upon the guiding member 132 which serves also to guide the stem 131 of the plunger 105, the slide 161 being guided upon the exterior of said guide while the plunger stem 131 is guided upon the interior thereof.

Figures 5, 6, 7:
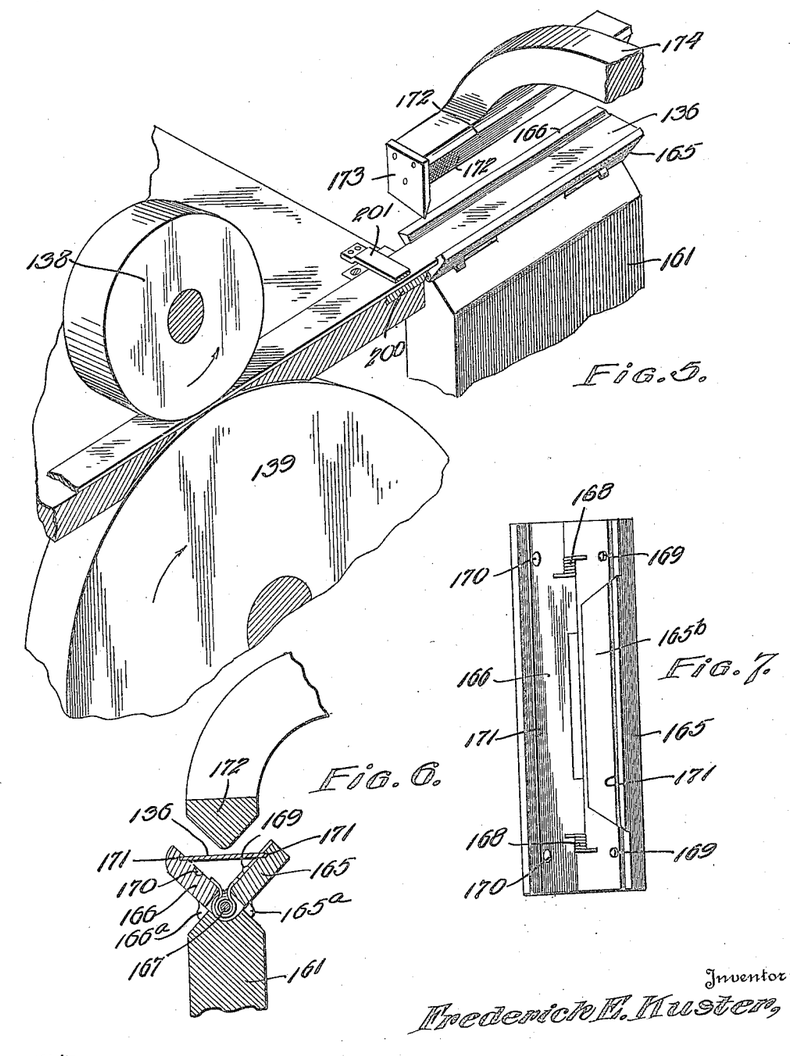
Figure 5 is an enlarged detail perspective view of the cutting mechanism with portions broken away and parts in section.
Figure 6 is a sectional detail of the former with parts broken away.
Figure 7 is a plan view of the lower portion of Figure 6.

The vertical slide 161 carries at its upper end the jaws 165 and 166 which are pivotally mounted, as at 167, 168 being spring serving to normally hold the jaws open or distended, as shown in Figures 6 and 7. The inner face of one of these jaws is provided with teats or projections 169 and the other jaw is provided with cooperating depressions 170 whereby as the jaws are brought together upon the tin, after the latter has been bent, the tin is punched or pressed into the sides of the tray. The opposing faces of these jaws are also provided with longitudinally disposed slots or guides 171 in which the tin strip 136 is retained when it is first supplied thereto. Figure 6 shows the tin strip held within the guides or recesses 171 in the jaws 165 and 166 ready to be operated upon by the knife and creaser which serves to bend the strip of tin between said jaws. The creaser 172 comprises a substantially V-shaped member of substantially the same length as the jaws 165 and 166, as seen in Figure 5, and at one end thereof is carried the knife 173 which serves to sever the tin strip after it is placed in position in the jaws, as seen in Figure 6, and acting to sever such tin strip just before the creaser 172 acts upon said strip to bend the same. The member 172 and its knife 173, it being understood that there is one for each tin strip and its applying mechanism, is carried by an arm 174 pivotally mounted, as at 175, upon a bracket 176 mounted on the frame 1, these two arms being shown clearly in Figure 2. Each arm is actuated through the medium of an arm 177 loosely mounted upon the shaft 142, see Figures 1 and 2, said arm being bent, as shown in Figure 1, and provided with an elongated slot 178 for an evident purpose. 179 is a spring connecting one end of this arm with a suitable member of the frame 1, as seen clearly in Figures 1 and 2. The arms 174 work through vertical slides 180 in the frame 1, as seen clearly in Figure 1.

181 is a roller on the arm 177 engaged by the cam 182 fast on the shaft 142, as seen in Figures 1 and 2, whereby the oscillatory motion is given to the arm 174, as will be evident.

Figure 8:
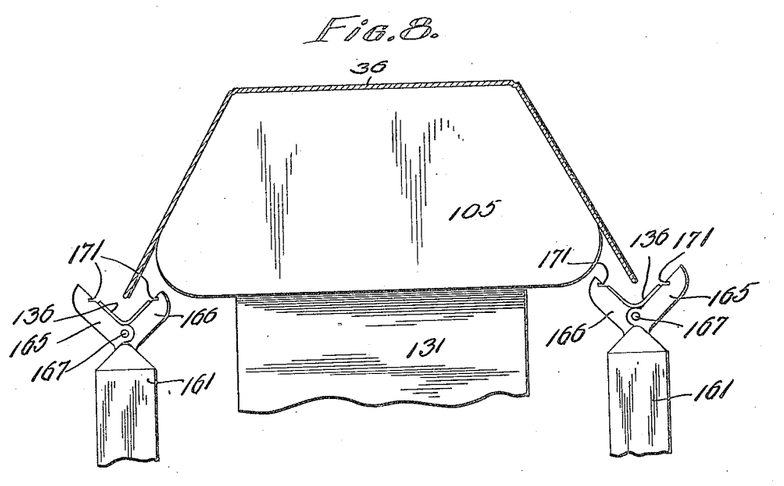
Figure 8 is a detail view in elevation with the material forming the tray in section, showing the clamps about to be engaged to affix the tin to the edges of the tray.
Figures 9, 15:
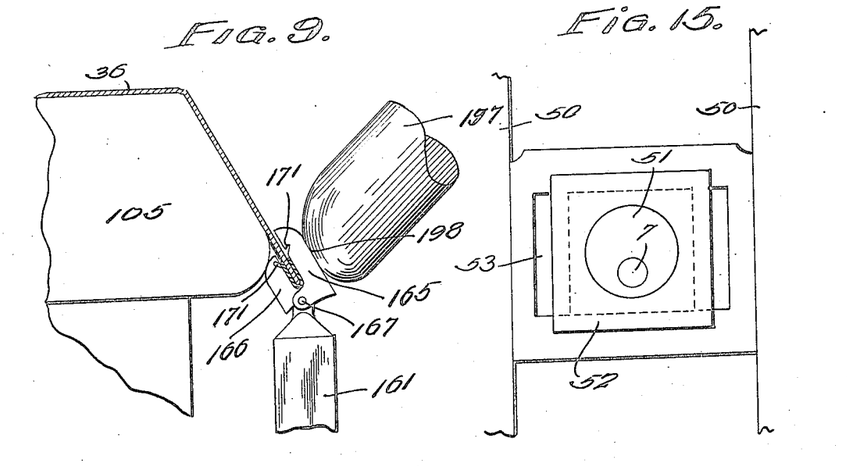
Figure 9 is a detail showing the position of the parts when the clamps have been closed and the tin affixed.
Figure 15 is a detail of the slidable boxing carried by the side members which carry the scoring knives.

The cam 182 is provided with an interior cam track 183, as shown by dotted lines in Figure 3, upon which is designed to travel a roller 184 projecting laterally from the guide member 185, to the upper end of which is pivotally connected, as at 186, the lower end of the rod 187 which is adjustable as to length by suitable means, as a turn-buckle 188, its upper end being pivotally connected, as at 189, with the crank arm 190 keyed on the rock shaft 191 mounted to fixed bearings 192 on the upper part of the frame, as seen best in Figure 1, and fast on this shaft 190 is the crank arm 193, the other end of which is pivotally connected, as at 194, with the lower end of a link 195, the upper end of which is pivotally connected, as at 196, with the upper end of the sliding rod 197, the lower end of which is shown as rounded, as at 198, so as to have a rolling contact or engagement with one of the jaws of the tin clamping means, as seen in Figure 9. As seen in Figure 2, this mechanism is duplicated, one being upon each side of the machine, and the two adapted to be operated simultaneously, so as to clamp the two tin strips upon the two sides of the tray at the same time. The members 197 are movable in suitable guides 199. Figure 9 shows the manner in which these members 197 operate to close the jaws 165 and 166 against the tin strips to clamp the same over the upper edges of the sides of the tray. Figure 6 shows the strip of tin in the jaws 165 and 166 being held in the recesses 171 and ready to be acted upon by the member 172 and the knife 173. Figure 8 shows the position of the tin strip just after the member 172 has acted thereupon to bend the same in the jaws, having forced the edges of the tin strip from the recesses 171, and the parts are ready for the operation of the members 197 to close the jaws and clamp the tin upon the edges of the sides of the tray, this having been done in Figure 9.

As seen in Figure 5, the knife 173 operates in conjunction with the fixed knife 200 seated in a recess in the upper face of the top of the frame and over which the tin strip is fed. Over this fixed knife is a transverse plate or strip 201 beneath which the tin strip is fed, as seen in Figure 5. This strip 201 serves to guide the tin strip and also prevents the same from buckling, and further to strip the loose end of the tin from the knives after it is cut.

The shaft 142 is revolved by means of the gear 202 fast thereon and meshing with a gear 203 fast on the shaft 7, as seen in Figure 1. From the shaft 142 I operate pickers that are designed to pick the completed trays from the plunger 105 and throw them out of the machine. These pickers 204 are carried by the arms fast on a shaft 206 mounted in suitable bearings, the said arms being in this instance as offset, as at 207, to clear other parts of the machine. The shaft 206 is rocked by means of an eccentric 208 on the shaft 142 and connected by a vertical rod 209 with a crank arm 210, so that the shaft 206 is rocked and the pickers given an oscillatory or swinging motion, to engage the completed trays and remove them from the machine at the rear end thereof.

Any suitable form of clutch mechanism may be employed for throwing the machine into and out of operation.

With the parts constructed and arranged substantially as hereinbefore described, and with the reels containing the strips of tin in position, and the reel containing the paper from which the tray is made properly positioned, the paper 36 is fed in at the front of the machine between the feed rollers 24 and 26, as seen clearly in Figures 1 and 2, being fed between the guides and forward between the rollers 30 and 31, and the strips of tin 136 fed between their rollers 138 and 139. The machine is now started; the forward end of the paper is held by the presser foot 97, the paper continues to be fed, but being held by the presser foot 97 it buckles between the primary and secondary set of feed rolls. When the presser foot 97 is down upon the paper, the upper feed roll 31 is lifted out of contact with such paper by reason of the arm 45 being depressed by the engagement of the pin 46 therewith. When the presser foot 97 is raised by the upward movement of the member 48, the roller 31 drops to feeding position, and the paper is fed over the lower die 54 and in the continued movement of the machine the member 48 is moved downward creasing and cutting the paper of which the tray is formed, it being understood that the presser foot 97 is moved downward with the scoring knife and the paper is held by such presser foot during the scoring and cutting operation. In the continued movement of the parts, the presser foot 97 is raised, the roller 31 is lowered and the paper thus scored is moved forward onto the guides or in position to rest upon the plunger 105 and in the next downward movement of the member 48 the blank is severed from the paper strip by means of the knife 76 cooperating with the knife 55, as will be readily understood upon reference to Figure 3. The blank 104 is, at this time, deposited in position to be operated on by the plunger 105 which is now moved upward through the medium of the means hereinbefore described, the sides of the tray being first formed down by the former 106, and in the further upward movement of the plunger 105 the formers 107 come into operation to fold down the ends of the blank and the folds at the corners. The formed tray is now upon the former 105 as seen in Figures 8 and 9. During this operation the strips of tin 136 which have been fed forward into the jaws 165 and 166, as seen in Figures 5 and 6, with the edges thereof retained in the recesses 171 of said jaws, are cut off and bent or formed into the shape shown in Figure 8, by the knife 173 and the former 172. By this operation the edges of the strips of tin are forced out of the recesses 171 and they appear as in Figure 8. The members 161 carrying the jaws, have, in the meantime, been raised by the mechanism hereinbefore described. Just at the moment that the plunger 105 reaches its highest stroke, the members 161 carrying the jaws 165 and 166, are brought to their highest point and then the members 197 are forced against the jaws 165 and the said jaws are forced toward the jaws 166, the free ends of which are backed up by the plunger 105, and thus pressure or blow of the members 197 forces the tin strips in close contact with the edges of the sides of the tray and at the same time the punches 169 are forced into the tin strips and paper so as to securely fasten the strips to the paper. The parts then start on their return movement, the members 197 being moved upward and away from the jaws when the latter are forced open by their springs and the parts return to their normal positions and the same cycle of operation is repeated as long as the machine is running.

The jaws 165 and 166 are prevented from opening beyond a predetermined point by means of the lugs 165ᵃ and 166ᵃ on the under side of said jaws, as seen in Figure 6.

In order that the portions of the tin between the fold lines upon the sides of the tray may be forced inward or indented along such lines, the jaws 165 are provided with a projection 165ᵇ upon its inner face, the ends thereof being upon the same angular lines as the lines of fold at said sides, this line of fold being along the line of the paper that is cut by the knives 66.

As the plunger descends, the completed trays with their side edges tinned are automatically picked off by the pickers 204, one upon each side of each tray, and the trays thrown rearward from the machine.

The parts are so timed with relation to each other that each step of the operation follows in proper sequence so that the machine runs without delay and as long as the machine is running the trays are continuously formed, tinned and thrown out from the machine.

From the foregoing, it will be seen that I have devised a complete and efficient machine for forming and tinning trays and automatically removing them from the machine, and, while the structural embodiment of the invention as herein disclosed is what I at the present time consider preferable, it is evident that the same is subject to changes, variations and modifications in detail, proportion of parts, etc., without departing from the spirit of the invention or sacrificing any of its advantages. I, therefore, do not intend to restrict myself to the details of construction, proportion of parts, etc., as hereinbefore disclosed, but reserve the right to make such changes, variations and modifications as come properly within the scope of the protection prayed.

What is claimed as new is:—

1. In a tray machine, tin-feeding means, a reciprocatory member carrying pivoted clamping members, adapted to receive the tin, and means carried by one of the clamping members for pressing the tin into the side of the tray between the folds at the ends and means to bend said tin over the edges of the sides of the tray.

2. In a tray machine, tin-feeding means, a reciprocatory member carrying pivoted clamping members, adapted to receive the tin, means carried by one of the clamping members for pressing the tin into the side of the tray between the folds at the ends, and means operable against said clamping members to bend the tin over the edges of the sides of the tray.

3. In a tray machine, means for feeding the tin, a reciprocatory member carrying pivoted clamping members, and means reciprocatory at subtsantially right angles to said clamping members to close the same to bind the tin over the edge of the side of the tray.

4. In a tray machine, means for feeding the tin, a reciprocatory member carrying pivoted clamping members, and means reciprocatory at substantially right angles to said clamping members to close the same to bind the tin over the edge of the side of the tray, said clamping members having recesses to initially receive the edges of the strip of tin.

5. In a tray machine, means for feeding the tin, a reciprocatory member carrying pivoted clamping members, and means reciprocatory at substantially right angles to said clamping members to close the same to bind the tin over the edge of the side of the tray, said clamping members having recesses to initially receive the edges of the strip of tin and also provided with means for indenting the tin strip to force it into the tray.

6. In a tray machine, tin feeding means, pivoted clamping members for holding the tin, a movably-mounted creaser engageable with the tin for bending the same while in said clamping members, and means carried by the creaser for severing the tin.

7. In a tray machine, tin feeding means, pivoted clamping members for holding the tin, a creaser engageable with the tin for bending the same while in said clamping members, and means carried by the creaser for severing the tin, the said creaser and severing means being movable together as a unit.

8. In a tray machine, tin feeding means, pivoted clamping members for holding the tin, means for bending the tin while in said clamping members, means for severing the tin, the said bending and severing means being operable as a unit, and means for afterwards closing said clamping members to bind the tin over the edge of a side of the tray.

9. In a tray machine, tin feeding means, pivoted clamping members for holding the tin, means for bending the tin while in said clamping members, means for severing the tin, the said bending and severing means being operable as a unit, and means for afterwards closing said clamping members to bind the tin over the edge of a side of the tray, said last-named means being reciprocatory at an angle to the said clamping members.

10. In a tray machine, tin feeding means, pivoted clamping members for holding the tin, means for bending the tin while in said clamping members, means for severing the tin, the said bending and severing means being operable as a unit, and means for afterwards closing said clamping members to bind the tin over the edge of a side of the tray, said last-named means being reciprocatory at an angle to the said clamping members, and having a rounded end.

11. In a tray machine, tin bending clamping members, a reciprocatory carrier for the same, and a member mounted for reciprocation and having a rounded end to engage one of said clamping members to close the clamping members and bind the tin over the edge of a tray.

12. In a tray machine, tin bending clamping members, a reciprocatory carrier for the same, a member mounted for reciprocation and having a rounded end to engage one of said clamping members to close the clamping members and bind the tin over the edge of a tray, and a former upon which the tray is shaped and against which one of said clamping members is engaged during the binding operation.

13. In a tray machine, tin bending clamping members, a reciprocatory carrier for the same, a member mounted for reciprocation and having a rounded end to engage one of said clamping members to close the clamping members and bind the tin over the edge of a tray, a former upon which the tray is shaped and against which one of said clamping members is engaged during the binding operation, and means for timing the said elements for successive operation.

14. In a tray machine, a tin bending clamp consisting of two opposed jaws pivotally mounted and having recesses upon their adjacent faces to initially receive and hold the edge of a strip of metal, means for reciprocating the clamp, and means engageable with the metal strip to bend the latter and by such bending remove the edges thereof from said recesses yet allow the strip to remain in the clamp.

15. In a tray machine, a tin bending clamp consisting of two opposed jaws pivotally mounted and having recesses upon their adjacent faces to initially receive and hold the edge of a strip of metal, means for reciprocating the clamp, and means engageable with the metal strip to bend the latter and by such bending remove the edges thereof from said recesses yet allow the strip to remain in the clamp, one of said jaws having a punch upon its inner face between the recess and the pivot of said jaw.

16. In a tray machine, a tin bending clamp consisting of two opposed pivoted jaws having recesses upon their adjacent faces to initially receive the edges of a strip of tin, one of said jaws having a punch upon its inner face, and one of the jaws having a member to press the tin into the side of the tray between the end folds of the tray and means for reciprocating said clamp.

17. In a tray machine, a tin bending clamp consisting of two opposed pivoted jaws having recesses upon their adjacent faces to initially receive the edges of the strip of tin, one of said jaws having a punch upon its inner face, and one of the jaws having a member to press the tin against the side of the tray between the end folds of the tray, combined with means for feeding a strip of tin to said jaws, and means for bending the tin in said jaws and severing the tin.

18. In a tray machine, means for feeding a strip of tin, and means operatively connected with the same and movable as a unit for bending and severing said strip the last-named means acting to give the initial bend only to the strip.

19. In a tray machine, means for feeding a strip of tin, means operatively connected with the same and movable as a unit for bending and severing said strip, the last-named means acting to give the initial bend only to the strip, said means being timed to move in unison and to act, the one immediately following the other.

20. In a tray machine, tin-feeding rollers, means for intermittingly actuating one of said rollers, and movably-mounted means operating in conjunction with said feed means for severing the tin and bending the same the bending and severing means being operable as a unit.

21. In a tray machine, tin-feeding rollers, means for intermittingly actuating one of said rollers, means operating in conjunction with said feed means for severing the tin and bending the same the bending and severing means being operable as a unit, and means for applying the bent strip to the edge of a tray and means for clamping said strip over the edge of the tray.

22. In a tray machine, tin-feeding rollers, a shaft, a cam thereon, means actuated by said cam for intermittingly operating one of the feed rollers, a tin clamp means co-operable with the clamp to bend a strip of tin and release the edges thereof means operating in conjunction with said cam for reciprocating the carrier of said clamp and means for clamping said strip over the edge of the tray.

23. In a tray machine, tin-feeding rollers, a shaft, a cam thereon, means actuated by said cam for intermittingly operating one of the feed rollers, a tin clamp and means operating in conjunction with said cam for reciprocating the carrier of said clamp, and reciprocatory means for bending and severing the strip of tin while in said clamp and means for clamping said strip over the edge of the tray.

In testimony whereof I affix my signature.

FREDERICK E. KUSTER.